United States Patent [19]
Wysocki

[11] 4,407,561
[45] Oct. 4, 1983

[54] METALLIC CLAD FIBER OPTICAL WAVEGUIDE

[75] Inventor: Joseph A. Wysocki, Oxnard, Calif.

[73] Assignee: Hughes Aircraft Company, El Segundo, Calif.

[21] Appl. No.: 196,955

[22] Filed: Oct. 14, 1980

[51] Int. Cl.³ .................... G02B 1/10; G02B 5/14; G02B 5/172
[52] U.S. Cl. .................... 350/96.3; 65/3.3; 65/4.2; 350/96.33; 427/163; 428/388
[58] Field of Search ............... 350/96.3, 96.33, 96.34, 350/96.29, 96.1; 428/386, 379, 381, 388, 389; 427/165, 383.5, 163; 65/3.1, 3.11, 3.12, 3.13, 3.3, 3.31, 3.2, 4.21; 250/227

[56] References Cited
U.S. PATENT DOCUMENTS

| | | | |
|---|---|---|---|
| 2,848,390 | 8/1958 | Whitehurst et al. | 65/3.3 X |
| 2,915,806 | 12/1959 | Grant | 65/3.3 X |
| 2,928,716 | 3/1960 | Whitehurst et al. | 65/3.3 |
| 3,019,515 | 2/1962 | Whitehurst et al. | 350/96.33 |
| 3,268,312 | 8/1966 | Grant . | |
| 3,347,208 | 10/1967 | Arridge . | |
| 3,434,774 | 3/1969 | Miller | 350/96.33 |
| 3,486,480 | 12/1969 | Heywood . | |
| 3,778,132 | 12/1973 | Pinnow et al. | 350/96.30 |
| 3,788,827 | 1/1974 | De Luca . | |
| 3,806,224 | 4/1974 | MacChesney et al. | 350/96.30 |
| 4,089,585 | 3/1978 | Slaughter | 350/96.23 |

FOREIGN PATENT DOCUMENTS
858179 12/1977 Belgium .

OTHER PUBLICATIONS
Almeida et al.-"On Line-Metal Coatings of Optical Fibres", Optic, 53(1979), No. 3; pp. 231-233.

*Primary Examiner*—Marvin L. Nussbaum
*Attorney, Agent, or Firm*—J. Dennis Moore; David W. Collins; Anthony W. Karambelas

[57] ABSTRACT

There is disclosed a metallic clad glass fiber optical waveguide suitable for use as a high-strength optical transmission line, e.g., for high capacity communications systems and for sensors operating at high temperature. A metallic coating or jacket is formed on the glass waveguide structure, which comprises a core and glass cladding, by coating the glass fiber as it emerges from the furnace with a metal or alloy. The metal or alloy employed is one that (a) is substantially chemically inert with respect to the material comprising the glass fiber at the melting point of the metal or alloy during coating of the metal or alloy onto the glass fiber, (b) has a recrystallization temperature greater than room temperature or the contemplated working temperature, whichever is greater, and (c) forms a hermetic seal around the outer surface of the glass cladding. The metallic coating prevents chemical or mechanical damage to the glass surface to thereby substantially maintain or preserve the nascent strength of the glass fiber. A plastic coating is optionally provided for additional protection of the metal surface.

17 Claims, 1 Drawing Figure

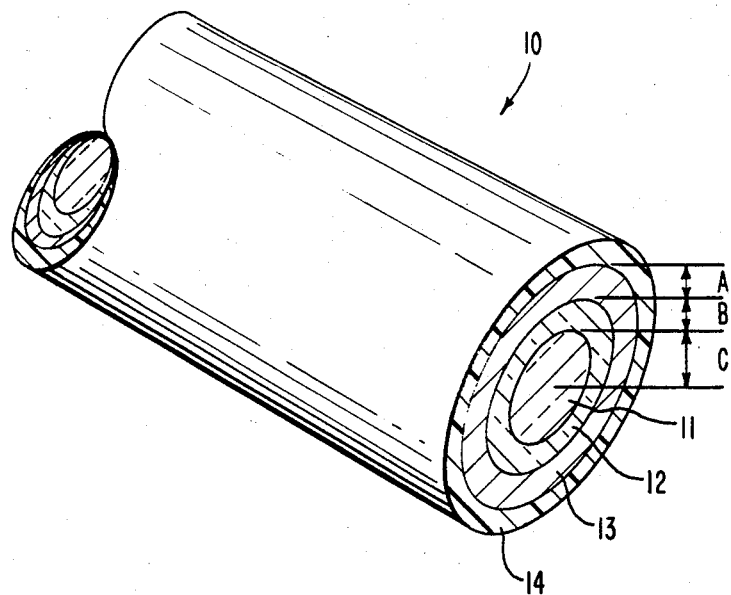

METALLIC CLAD FIBER OPTICAL WAVEGUIDE

BACKGROUND OF THE INVENTION

1. Field of the Invention

This invention relates to high-strength fiber optical waveguides comprising a silica cladding surrounding a core, and, in particular, to metallic clad optical waveguides employing a metal or alloy coating that does not react with the silica.

2. Description of the Prior Art

The current state-of-the-art of doped silica fiber optical waveguides has progressed to the point where low-loss (below 5 dB/km) is becoming routine and the major technical uncertainty which may yet determine the success or failure of this emerging technology relates to packaging of the fiber into a cable structure that will protect the silica from hostile elements that can cause it to break. The fragility of glass fibers is well-known and it is the main reason why some early exploratory systems used bundles of silica fibers rather than single strands in their optical data links.

For many applications, the solution to the problem requires the strengthening of the individual fibers. When long-length (1 km or greater), high-tensile strength fibers are available, communication and data links can be made with lightweight single strand fibers rather than heavily armored cables or with bundles. It should be noted that the absolute value of the tensile strength is not so important, so long as it is useful (e.g., at least about 25,000 psi); of greater importance is that the tensile strength evidence substantially no degradation over a period of time. For the case of optical fibers employed in high temperature applications, the tensile strength should evidence no more than a predetermined degradation.

Optical waveguides of the type discussed above are described in greater detail in U.S. Pat. Nos. 3,434,774, 3,778,132, 3,788,827 and 3,806,224. A considerable effort has been expended on coating such fiber optical waveguides with organic materials such as thermoplastics and ultraviolet-cured polymers. These materials are satisfactory for a short time, but they do not form a hermetic seal. Eventually, they will pass contaminants such as moisture which will attack the glass surface and weaken the fiber.

U.S. Pat. No. 3,778,132 discloses an outer shielding layer to avoid cross-talk between adjoining lines which may, for example, be plastic or vapor-deposited chrome metallization. However, this layer is necessarily very thin because it is vapor-deposited and does not have either a sufficiently low resistance for electric conductivity or a sufficient thickness for strengthening, or even preserving the strength of, the fiber. It is, in fact, impractical to achieve such a thickness or a hermetic seal by the vapor deposition technique, which is inherently slow.

U.S. Pat. No. 3,788,827 also relates to the vapor deposition of the coating of plastic or hydrophobic metal onto the optical waveguide by a process that would require the unprotected fiber to pass through a vacuum seal. Contact between the fiber and seal would damage the surface of the waveguide and hence weaken it before the coating could be applied.

Metallic claddings have been employed for preserving the strength of optical fibers. U.S. Pat. No. 4,089,595 discloses forming a continuous coating of a metallic material such as as aluminum or an aluminum-based alloy on the surface of a fiber optical waveguide. However, aluminum and most aluminum-based alloys are known to react with silica, causing a degradation of strength over the long term.

Belgian Pat. No. 858,179 discloses metallic clad fiber optical waveguides comprising a central core, a glass cladding concentrically surrounding the core and a metallic coating concentrically surrounding the glass cladding. The core and cladding materials are those customarily employed in fiber optical waveguides and are typically silica-based. The metallic jacket comprises a malleable metal (rather than a hard metal) in order to avoid the negative effects of micro-bending attenuation. Suitable malleable metals disclosed include aluminum, antimony, bismuth, cadmium, silver, gold, zinc, lead, indium, tin and their alloys, such as indium-silver alloys, aluminum-nickel alloys or silver-gold alloys.

Methods of applying metal coatings to glass fiber which consist of solid homogeneous materials and which are not optical waveguides but are intended for structural uses in fabric and like are disclosed in, for example, U.S. Pat. Nos. 2,928,716, 3,268,312, 3,347,208 and 3,486,480. It is noted that the physical technique of coating glass fibers with metals in the molten state while the glass is being drawn has per se been known for some time, as shown by these references.

SUMMARY OF THE INVENTION

In accordance with the invention, means is provided for maintaining or preserving the nascent strength of a glass fiber optical waveguide without substantially interfering with the optical transparency of the waveguide or the flexibility thereof. The inventive approach is suitable for use in flexible glass fiber waveguides for the transmission of optical electromagnetic energy. The optical waveguide includes a glass core member having a first minimum refractive index for the optical radiation and a glass cladding concentrically surrounding the core, the glass cladding including at least one layer having a second refractive index for the optical radiation which is lower than the minimum of the first refractive index by at least 0.1% to produce internal reflection of the optical radiation at the core/clad interface and to thereby guide the optical radiation along the waveguide.

The means for preserving the nascent strength of the glass fiber optical waveguide comprises a coating of a metal or alloy that (a) is substantially chemically inert with respect to the material comprising the glass fiber at the melting point of the metal or alloy during the time of coating the metal or alloy onto the glass fiber waveguide, (b) possesses a recrystalization temperature greater than room temperature or the working temperature of the glass fiber, whichever is greater and (c) forms a hermetic seal around the glass fiber. The mechanical properties of glass fiber optical waveguides are better preserved with the metal and alloy coatings of the invention, as compared with other coatings, whether metallic or non-metallic.

The metallic clad glass fiber optical waveguide may also be used in high temperature applications, providing the working temperature does not cause an undue loss in strength. For most applications, a working temperature less than about $\frac{2}{3} T_m$(°K.), where $T_m$ is the melting point of the metal or alloy, is adequate for avoiding undue loss of strength. Judicious selection of a particular metal or alloy permits use of the waveguide at the working temperature for periods of time of at least one year, with no more than 100% damage.

BRIEF DESCRIPTION OF THE DRAWING

The FIGURE is a perspective view, partly in section, showing on an enlarged scale the details of the metallic clad fiber optical waveguide of the invention.

DETAILED DESCRIPTION OF THE INVENTION

There is shown in the FIGURE (not to scale) a metallic clad fiber optical waveguide 10 in accordance with the invention. The waveguide is of indeterminate length. Waveguide 10 comprises a central core 11, a glass cladding 12 concentrically surrounding the core 11 and a metallic coating or jacket 13 concentrically surrounding the glass cladding 12. Core portion 11 is preferably high-purity $SiO_2$ or doped silica having a first index of refraction, $n_1$. The guiding or cladding portion 12 may be $SiO_2$ or any suitable glass material having a slightly lower index of refraction, $n_2$. The core 11 may have a uniform index of refraction or it may comprise two or more layers, with each successive layer being of lower index than that underlying so as to approximate the parabolic gradient of particular utility in multi-mode structures. Cladding 12 is usually of uniform composition but may also be of graded composition. The second index of refraction is generally at least about 0.1% less than the first index of refraction in order to produce total internal reflection of optical radiation at the core/clad interface and thereby guide the optical radiation along the waveguide. For multi-mode fibers, $n_2$ is usually about 1% less than $n_1$.

The metallic jacket 13 comprises a metal or alloy that is substantially chemically inert with respect to the glass fiber, more particularly, with respect to the cladding portion 12. That is, the metal or alloy is one that does not react chemically with the glassy material at the melting point of the metal or alloy during the time of coating the metal or alloy onto the glass fiber. The metallic coating, as more fully described below, is conveniently applied by passing the fiber through a molten pool of the metal or alloy. In view of the velocity with which a fiber passes through a molten pool of the metal or alloy being coated on the fiber (about 1 to 10 ft/sec, usually about 3 ft/sec), the melting point of the metal or alloy may be higher than the softening point of $SiO_2$. In particular, the melting point of the metal or alloy to be coated may range as high as about 2,300° C., so long as the fiber itself does not experience a temperature greater than its softening point.

In determining whether a particular metal or alloy is stable under the conditions described above, a comparison of the free energy of formation of the corresponding oxide at the melting point of the metal or alloy with the free energy of formation of silica at the same temperature is necessary. The free energy of formation of an oxide of the metal or alloy must be less negative than the free energy of formation of silica at the melting point of the metal or alloy; otherwise, such metal or alloy would have a higher affinity for oxygen than silicon and thus would react with $SiO_2$. However, if the kinetics of oxide formation are sufficiently sluggish, use of metals and alloys having a free energy of formation of the corresponding oxide somewhat more negative than the free energy of formation of silica may be employed.

Metal elements suitable in the practice of the invention include vanadium, chromium, manganese, iron, cobalt, nickel, copper, arsenic, strontium, zirconium, niobium, rhodium, palladium, tellurium, barium, iridium, platinum and thallium. Alloys suitable in the practice of the invention include alloys containing these elements in combination with each other or in combination with other elements, whether metallic or non-metallic, so long as the alloys remain ductile at ordinary temperatures of use. Examples of such other alloying metal elements include aluminum, tin, lead, zinc and cadmium, while examples of such other alloying non-metal elements include antimony, bismuth, boron, carbon, phosphorus and silicon. Such alloys of metal elements with additional elements comprise a major portion (i.e., greater than 50% by weight) of the metal elements and a minor portion (less than 50%) of additional elements. Due to factors related to toxicity, expense, ease of handling and other factors, elements such as manganese, arsenic, strontium, rhodium, tellurium, barium, iridium, platinum and thallium, which are otherwise suitable, are not likely to find use except as alloying elements and hence are not preferred as elemental metal coatings.

Since the free energy of formation values are not always available, especially for alloys, it is sufficient evidence that the strength of the metallic clad optical fiber be substantially not less than that of the unclad fiber in determining the suitability of a particular metal or alloy. The strength comparison should be made at the same strain rates; these rates should be fast enough to limit static fatigue in the range of interest. Further, the unclad fiber used for comparison should be tested before it contacts any other solid. Failures in the holding fixture for the strain test are ignored in the comparison; such failures are not considered part of the original sample population, since the failure is clearly associated with the testing fixture.

A further constraint on the selection of a suitable metal or alloy is that the recrystallization temperature be greater than room temperature or the anticipated use temperature for the glass fiber, whichever is greater. Otherwise, continual plastic deformation of the metallic cladding will occur under an applied load. Metals such as tin, lead, zinc and cadmium have recrystallization temperatures less than room temperature, and thus would not be suitable as elemental claddings in the practice of the invention, even though the free energies of formation of $SnO_2$, PbO and ZnO are otherwise favorable.

The metallic jacket 13 is coated onto the silica surface of the glass cladding 12 of the fiber 10 in such a way as to provide a tight, permanent and durable hermetic seal about the glass fiber. The coating is applied to the glass fiber during the drawing operation immediately after the fiber emerges from the furnace, employing apparatus well-known for coating glass fibers with metals. Importantly, the coating is applied before the fiber has a chance to be abraded by the take-up drum onto which the coated fiber is spooled and even before the fiber cools to the point where ambient moisture can stick to its surface.

Determination of the adequacy of hermetic sealing is made by preparing a plot of log (stress) versus log (time) of a plot or log (strain rate) versus log (mean failure stress). As is well-known, a slope of substantially zero implies a hermetic seal.

The metallic coating process may, for example, be accomplished by passing the glass fiber through a coating cup which contains the molten metal or alloy to be coated onto the fiber at a temperature slightly above the melting point of the metal or alloy. The cup has a small hole in its bottom large enough to pass the glass fiber but sufficiently small so that surface tension of the molten metal or alloy prevents it from running out. As the glass fiber passes through the cup, a thin layer of metal or alloy freezes onto the surface of the glass fiber.

Proper conditions for the formation of a strong, adherent metallic layer on the glass fiber surface require that the temperature of the metal-containing bath through which the glass fiber is passed be slightly greater than the melting point of the metal or alloy, while the temperature of the glass fiber be somewhat below this melting point. Further, in the case of alloys, the alloy must evidence continuous solubility in the liquid state in order to avoid segregation of phases in these alloys during cooling. The thickness of the metallic layer (dimension A in the FIGURE) is controlled by adjusting the fiber drawing rate and the temperature differential between the fiber and the metal-containing bath. Typically, the thickness A of the metallic jacket 13 lies in the range from about 10 to 50 $\mu$m and preferably lies in the range of about 15 to 20 $\mu$m. The maximum thickness is restricted by a requirement to not impair the flexibility of the fiber and otherwise interfere with optical properties, whereas the minimum thickness is set by a requirement to achieve adequate strength and hermetic sealing.

In order to achieve these effects while simultaneously not impairing the optical transparency of the waveguide due to resulting excess optical attenuation from the metallic coating, it is necessary to maintain the radial thickness of the glass-cladding layer 12 (dimension B in the FIGURE) in the range of about 10 to 250 $\mu$m and preferably in a range of about 10 to 50 $\mu$m. The radius C of core 11 should lie in the range from about 5 $\mu$m for single mode fibers to about 200 $\mu$m for multi-mode fibers. For the commonly used multi-mode fibers, the preferred range for radius C is about 25 to 45 $\mu$m. This preferred range arises from a trade-off between the ease of fiber splicing, which favors large cores, and the expense of the ultra-high purity core material, which favors small cores. The total diameter of the waveguide 10 should, however, be less than about 500 $\mu$m. That is to say, the sum of the radius C of core 11 plus the thickness B of glass-cladding 12 plus the thickness A of the metal jacket 13 should be less than about 250 $\mu$m in order to maintain reasonable flexibility of the waveguide.

The resulting glass fiber optical waveguide 10 evidences a retention of mechanical strength of the nascent glass fiber to greater extent than evidenced by other metallic and non-metallic clad fiber optical waveguides. Further, the waveguide of the invention will not fail due to static fatigue if it is used at less than about $\frac{3}{4}$ of its original tensile strength, regardless of the absolute value of that tensile strength. The high pristine ultimate strength of the glass fiber material is known to be approximately $2 \times 10^6$ psi and is therefore more than adequate to achieve a final desired level in excess of 25,000 psi. The reason that long fibers have not heretofore been prepared with strengths approaching the pristine ultimate value is that the presence of sub-micrometer surface flaws caused either by light mechanical abrasions during and after the usual fiber-drawing operation or by chemical attack of atmospheric contaminants such as moisture weakened the fiber. The disastrous effect of surface flaws on the strength of glass is well-known.

The metallic layer or jacket 13 provides good mechanical protection and a hermetic seal against contamination. Additional mechanical protection, galvanic protection and electrical insulation can be achieved as needed by applying a plastic overcoat 14 outside of the metallic jacket 13. For example, as little as 10 to 25 $\mu$m of a polyvinyl formate coating is useful in preserving the integrity of the metallic cladding in an electrolytic cell with stainless steel electrodes and salt water. Other plastic coatings may also be used.

It is now known that the influence of the effect of a metallic boundary layer on a doped silica waveguide comprising core member 11 and glass cladding 12 on the optical attenuation is negligible if the cladding glass thickness is greater than about 10 $\mu$m. Since the glass claddings on most of the present low-loss waveguides are actually in the range of at least about 25 $\mu$m, the metallic layer does not impose any new constraints on the waveguide size.

While the requirement of minimizing excess attenuation sets the minimum thickness for the glass cladding 12, the requirement for effectively strengthening the fibers sets the minimum thickness A for the metallic jacket 13, which, as described above, is at least 10 $\mu$m and may range up to about 50 $\mu$m. A metallic jacket of this thickness will provide the necessary hermetic seal and strengthening function and in the case where the metal is a good electrical conductor such as copper, it will simultaneously afford a good electrical conductor since its resistivity $\rho$ is about $10^{-6}$ ohm-cm. While the primary function of the jacket is to maintain the strength of the fiber, there are many applications where it is necessary or desirable to have a channel of electrical communication for use simultaneously with the optical waveguide. Alternatively, there may be instances where a metallic conductor having desirable magnetic properties may be employed. Suitable metals for such applications include iron, cobalt and nickel.

In another embodiment of the invention, a glass fiber optical waveguide having a metallic coating is provided which is capable of withstanding conditions of high temperatures for over one year without reacting with the glass fiber. In particular, the waveguides of this embodiment are capable of operating continuously for at least a year at a temperature up to about $\frac{2}{3} T_m$ (°K.), where $T_m$ is the melting point of the metal or alloy, with no more than about 100% damage (i.e., no more than about 50% loss of strength). Metals and alloys suitable in the practice of this embodiment are selected from those listed above, employing the same considerations of thickness, free energy and deposition methods previously discussed, with the added proviso that the melting point of the metal or alloy be at least about 50% greater than the contemplated working temperature. For such metals and alloys, the recrystallization temperature must be greater than the working temperature. Such metallic clad optical fibers are used, e.g., in oil well probes (200° C.), as liquid level sensors in nuclear reactors (350° C.) and for monitoring blade temperature in turbine blades (1000° C.).

What is claimed is:

1. A flexible fiber optical waveguide for the transmission of optical electromagnetic radiation, said waveguide comprising a glass fiber including a glass core member having a first minimum refractive index for said radiation and a glass cladding concentrically surrounding said core, said glass cladding including at least one layer having a second refractive index for said radiation which is lower than the minimum of said first refractive index by at least 0.1% to produce total internal refraction of said optical radiation at the core/clad interface and to thereby guide said optical radiation along said waveguide, characterized in that said glass fiber is provided with a coating of a metal or alloy of sufficient thickness to substantially preserve the nascent strength of said glass fiber waveguide without substantially interfering with the optical transparency of said waveguide or the flexibility thereof, and said metal or alloy
   (a) is substantially chemically inert with respect to the material comprising said glass fiber at the melting point of said metal or alloy during coating of said metal or alloy onto said glass fiber;
   (b) has a recrystallization temperature greater than room temperature or the anticipated working temperature, whichever is greater; and
   (c) forms an hermetic seal around the outer surface of said glass cladding.

2. The waveguide of claim 1 in which said metal comprises an element selected from the group consisting of vanadium, chromium, iron, cobalt, nickel, copper, zirconium, niobium and palladium.

3. The waveguide of claim 2 in which said metal comprises an element selected from the group consisting of iron, cobalt, nickel and copper.

4. The waveguide of claim 1 in which said alloy evidences continuous solubility in the liquid state.

5. The waveguide of claim 1 additionally comprises a plastic coating formed on said coating of metal or alloy.

6. A process for treating a fiber optical waveguide employed in the transmission of optical electromagnetic radiation, said waveguide comprising a glass fiber including a glass core member having a first minimum refractive index for said radiation and a glass cladding concentrically surrounding said core, said glass cladding including at least one layer having a second refractive index for said radiation which is lower than the minimum of said first refractive index by at least 0.1% to produce total internal refraction of said optical radiation at the core/clad interface and to thereby guide said optical radiation along said waveguide, characterized in that said process comprises coating said glass fiber with a metal or alloy to a sufficient thickness to substantially preserve the nascent strength of said glass fiber waveguide, wherein said metal or alloy
   (a) is substantially chemically inert with respect to the material comprising said glass fiber at the melting point of said metal or alloy during coating of said metal or alloy onto said fiber;
   (b) has a recrystallization temperature greater than room temperature or the anticipated working temperature, whichever is greater; and
   (c) forms an hermetic seal around the outer surface of said cladding.

7. The process of claim 6 in which said metal comprises an element selected from the group consisting of vanadium, chromium, iron, cobalt, nickel, copper, zirconium, niobium and palladium.

8. The process of claim 9 in which said metal comprises an element selected from the group consisting of iron, cobalt, nickel and copper.

9. The process of claim 6 in which said alloy evidences continuous solubility in the liquid state.

10. The process of claim 6 further comprising forming a plastic coating on said coating of metal or alloy.

11. The process of claim 6 in which said glass fiber is coated by passage through a molten pool of said metal or alloy following drawing said glass fiber.

12. A flexible fiber optical waveguide for the transmission of optical electromagnetic radiation, said waveguide comprising a glass fiber including a glass core member having a first minimum refractive index for said radiation and a glass cladding concentrically surrounding said core, said glass cladding including at least one layer having a second refractive index for said radiation which is lower than the minimum of said first refractive index by at least 0.1% to produce total internal refraction of said optical radiation at the core/clad interface and to thereby guide said optical radiation along said waveguide, characterized in that the nascent strength of said glass fiber waveguide is substantially preserved without substantially interfering with the optical transparency of said waveguide or the flexibility thereof by said glass fiber being provided with a coating of an alloy, wherein a major portion of said alloy comprises at least one element selected from the group consisting of vanadium, chromium, iron, cobalt, nickel, copper, zirconium, niobium and palladium, and wherein said alloy
   (a) is substantially chemically inert with respect to the material comprising said glass fiber at the melting point of said alloy during coating of said alloy onto said glass fiber;
   (b) has a recrystallization temperature greater than room temperature or the anticipated working temperature, whichever is greater; and
   (c) forms an hermetic seal around the outer surface of said glass cladding.

13. The waveguide of claim 12 in which said alloy includes at least one additional element selected from the group consisting of manganese, arsenic, strontium, rhodium, tellurium, barium, iridium, platinum, thallium, aluminum, tin, zinc, antimony, bismuth, boron, carbon, phosphorus and silicon.

14. The waveguide of claim 13 in which said additional element is at least one selected from the group consisting of manganese, arsenic, aluminum, tin, zinc, antimony, boron, carbon, phosphorus and silicon.

15. A process for substantially preserving the nascent strength of a fiber optical waveguide employed in the transmission of optical electromagnetic radiation, said waveguide comprising a glass fiber including a glass core member having a first minimum refractive index for said radiation and a glass cladding concentrically surrounding said core, said glass cladding including at least one layer having a second refractive index for said radiation which is lower than the minimum of said first refractive index by at least 0.1% to produce total internal refraction of said optical radation at the core/clad interface and to thereby guide said optical radiation along said waveguide, characterized in that said process comprises coating said glass fiber with an alloy, wherein a major portion of said alloy comprises at least one element selected from the group consisting of vanadium, chromium, iron, cobalt, nickel, copper, zirconium, niobium and palladium, and wherein said alloy
   (a) is substantially chemically inert with respect to the material comprising said glass fiber at the melting point of said alloy during coating of said alloy onto said glass fiber;

(b) has a recrystallization temperature greater than room temperature or the anticipated working temperature, whichever is greater; and
(c) forms an hermetic seal around the outer surface of said cladding.

16. The process of claim 15, in which said alloy includes at least one additional element selected from the group consisting of manganese, arsenic, strontium, rhodium, tellurium barium, iridium, platinum, thallium, aluminum, tin, zinc, antimony, bismuth, boron, carbon, phosphorus and silicon.

17. The process of claim 16, in which said additional element is at least one selected from the group consisting of manganese, arsenic, aluminum, tin, zinc, antimony, boron, carbon, phosphorus and silicon.

* * * * *